United States Patent [19]
Ohnuki et al.

[11] Patent Number: 5,292,585
[45] Date of Patent: Mar. 8, 1994

[54] MAGNETIC RECORDING MEDIUM COMPRISING A MAGNETIC FILM LAYER AND A COATING OF PURIFIED PERFLUOROPOLYETHER LUBRICANT

[75] Inventors: Yukio Ohnuki, Yokohama; Satoshi Kurosawa, Ebina; Akio Kondo, Konan, all of Japan

[73] Assignee: Tosoh Corporation, Shinnanyo, Japan

[21] Appl. No.: 753,230

[22] Filed: Aug. 30, 1991

[30] Foreign Application Priority Data

Aug. 30, 1990 [JP] Japan .................. 2-226768
Nov. 1, 1990 [JP] Japan .................. 2-293701

[51] Int. Cl.$^5$ .................................................. G11B 5/00
[52] U.S. Cl. ................................ 428/336; 428/422; 428/694 TF; 428/900
[58] Field of Search ............. 428/422, 694, 695, 900, 428/336, 694 TF

[56] References Cited

U.S. PATENT DOCUMENTS

| | | | |
|---|---|---|---|
| 4,178,465 | 12/1979 | Caporiccio et al. | 568/601 |
| 4,247,593 | 1/1981 | Seto et al. | 428/328 |
| 4,585,567 | 4/1986 | Strohbach | 252/58 |
| 4,816,334 | 3/1989 | Yokoyama et al. | 428/336 |
| 5,026,577 | 6/1991 | Biresaw et al. | 428/1 |
| 5,051,319 | 9/1991 | Kuse et al. | 428/694 |

*Primary Examiner*—Stevan A. Resan
*Attorney, Agent, or Firm*—Oblon, Spivak, McClelland, Maier & Neustadt

[57] ABSTRACT

A magnetic recording medium having coated thereon a lubricant of such a purity that no impurities and low molecular weight species are substantially detected by gel permeation chromatography.

4 Claims, 9 Drawing Sheets

MAGNETIC RECORDING MEDIUM COMPRISING A MAGNETIC FILM LAYER AND A COATING OF PURIFIED PERFLUOROPOLYTHER LUBRICANT

BACKGROUND OF THE INVENTION

1. Field of the Invention

The present invention relates to a magnetic recording medium, such as a magnetic recording medium which is useful, for example, as a magnetic recording means in an external memory apparatus (a magnetic disk recorder) for computers, etc., and a process for its production.

2. Discussion of Background

A magnetic recording medium is available usually in the form of a tape, a disk or a drum. Among them, a disk type of magnetic recording medium is composed of a rigid substrate of e.g. an aluminum alloy and a magnetic recording layer formed thereon, and further a lubricant is coated on the surface thereof. Coating of such a lubricant is conducted usually by a spin-coating method or a dipping method. It is attempted to improve the abrasion resistance of the magnetic recording medium by coating the lubricant. For example, in the dipping method, a magnetic recording medium is immersed in a solution having the lubricant dissolved in a solvent and then withdrawn, and the solvent is dried to obtain a magnetic recording medium having the lubricant coated thereon. In a drive apparatus for a magnetic recording medium which is presently commonly employed, a contact-start-stop (C.S.S.) system is adopted wherein a head is brought in contact with the magnetic recording medium as the drive apparatus is stopped and driven. Accordingly, the coated lubricant is required to provide durability in C.S.S. test by use of the above drive apparatus. A magnetic recording medium having excellent durability in C.S.S. test is required to have the coated lubricant uniformly deposited on the surface of the magnetic recording medium even after the storage of the magnetic recording medium for a long period of time in a high temperature, low temperature or high humidity environment, or even after the C.S.S. test over a long period of time. Particularly, it is important that the thickness of the lubricant does not change in the above environment or during the C.S.S. test.

As the lubricant to be coated on the magnetic recording medium, it is common to employ a commercially available perfluoropolyether type lubricant. However, a conventional magnetic recording medium using such a lubricant had a problem with respect to the durability in C.S.S. test. Namely, in a high temperature high humidity environment, a migration phenomenon is likely to take place wherein the thickness of the coated lubricant decreases, whereby the C.S.S. durability is substantially impaired. On the other hand, in a low temperature environment or a high humidity environment, the viscosity of the lubricant decreases rapidly, and the lubricating property of the lubricant tends to be inadequate, whereby the durability tends to be impaired.

Further, the process of coating the lubricant used to be complicated including heat treatment of the magnetic recording medium prior to or after the coating and a cooling step after the heating, in addition to the coating of the lubricant.

As the solvent for the above lubricant, a fluorinated solvent containing chlorine atoms in its molecule, such as trichlorotrifluoroethane, is employed. However, such a solvent having a low boiling point has recently been regarded as a factor causing destruction of the environment, and its use will certainly be regulated respectively in the future.

SUMMARY OF THE INVENTION

It is an object of the present invention to provide a magnetic recording medium having excellent durability in C.S.S. test and particularly to provide a magnetic recording medium having excellent durability even under a severe environmental condition without change in the thickness of the coated lubricant.

Further, it is an object of the present invention to provide a process whereby the several steps of coating the lubricant to the magnetic recording medium are simplified.

It is another object of the present invention to provide a process for producing a magnetic recording medium excellent in the durability in C.S.S. test without using a fluorinated solvent containing chlorine atoms in its molecule which is regarded as a factor causing an environmental pollution.

The present inventors have conducted an extensive research on lubricants to solve the above problems. As a result, they have found it possible to impart excellent durability to a magnetic recording medium by coating a purified lubricant to the magnetic recording medium. Further, they have found it possible to produce a magnetic recording medium having excellent C.S.S. durability by using a purified fluorine-containing polymer lubricant and using a fluorinated solvent containing no chlorine atoms in its molecule. The present invention has been accomplished on the basis of these discoveries.

Thus, the present invention provides a magnetic recording medium having coated thereon a lubricant of such a purity that no impurities are substantially detected by gel permeation chromatography (hereinafter referred to as GPC).

Further, the present invention provides a process for producing a magnetic medium including a step of coating a lubricant on the surface of a magnetic recording medium by means of a solvent having the lubricant dissolved therein, wherein a fluorinated solvent containing no chlorine atom in its molecule is used as the solvent, and a fluorine-containing polymer lubricant of such a purity that no impurities are substantially detected by GPC is used as the lubricant.

DETAILED DESCRIPTION OF THE PREFERRED EMBODIMENTS

The magnetic recording medium of the present invention has coated thereon a lubricant of such a purity that no impurities are substantially detected by GPC, which is obtainable by purifying a lubricant, whereby the thickness of the lubricant will not change even under a severe condition, and accordingly the C.S.S. durability will be improved. The reason for such an improvement is believed to be attributable to the fact that by the purification of the lubricant to be employed, impurities and low molecular weight species contained in the lubricant, which readily vaporize by heating are removed. Further, the purified fluorine-containing polymer lubricant of such a purity that no impurities are substantially detected by GPC, to be used in the present invention, dissolves in a fluorinated solvent containing no chlorine atom in its molecule. Accordingly, the lubricant can be coated on the surface of the magnetic recording medium without employing a fluorinated solvent containing chlorine atoms in its molecule.

Figure 1:
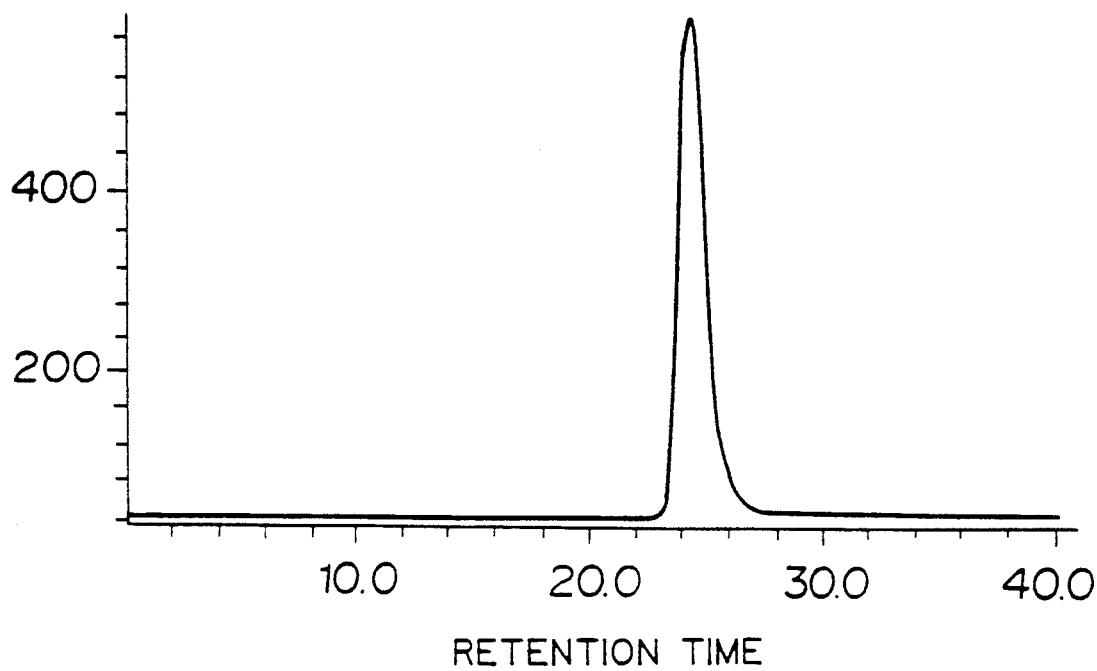
FIG. 1 is a chart showing the results of the measurement by GPC of the purified lubricant coated on the magnetic recording medium in Example 1 of the present invention.
Figure 2:
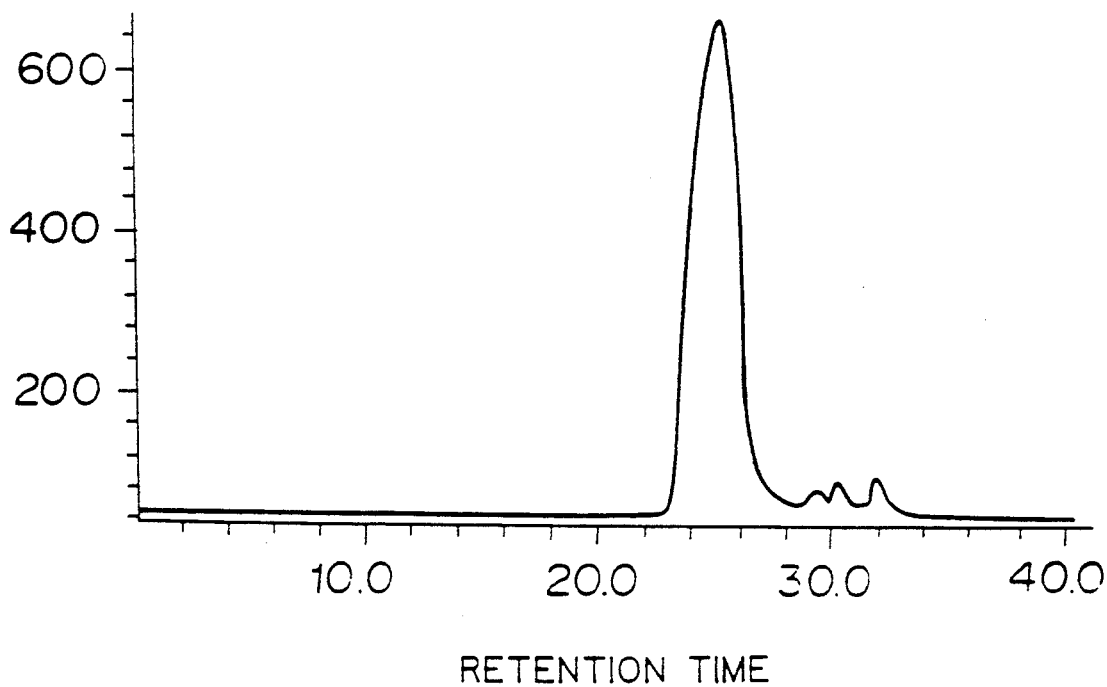
FIG. 2 is a chart showing the results of the measurement by GPC of the same lubricant before purification.

The lubricant to be coated on the magnetic recording medium of the present invention is not particularly limited so long as it is a lubricant which can be coated on a magnetic recording medium. It may be a perfluoropolyether type lubricant which is commonly used as the lubricant. Such a lubricant is obtainable usually by a polymer synthesis, but the obtained lubricant usually contains impurities in an amount of from a few % to a few tens %. When a such lubricant is coated on a magnetic recording medium, substantially the same proportion of impurities will be contained in the coated lubricant. Such impurities include e.g. an unreacted material of the compound used for imparting functional groups to the lubricant in the process for preparing the lubricant. Further, besides the impurities, relatively low molecular weight species which readily vaporize by heating are contained in the lubricant. These impurities including low molecular weight species in the lubricant can be detected by GPC, and the lubricant to be coated on the magnetic recording medium of the present invention is required to be purified to remove such impurities. Here, in the present invention, no impurities being detected by GPC means that in the chart of GPC, no peak is observed at least on the side where the retention time is larger than the main peak. This is illustrated in FIGS. 1 and 2. Each of these figures is a chart obtained by the measurement by GPC of a lubricant. FIG. 1 is a chart of the lubricant wherein no impurities are detected, whereas FIG. 2 is a chart of a lubricant wherein impurities are detected. In FIG. 1, there is no peak present at least on the side where the retention time is larger than the main peak. Whereas, in FIG. 2, a number of peaks are present on the side where the retention time is larger than the main peak. More specifically, the main peak of the purified lubricant as shown in FIG. 1, begins to rise at a molecular weight of about 700, and no chemical species having a molecular weight of less than about 700 exists. Whereas, the main peak of the non-purified lubricant as shown in FIG. 2, begins to rise at a molecular weight of about 300, and low molecular weight species and impurities are contained in the lubricant.

Purification of the lubricant can be conducted, for example, by means of an organic solvent which is a good solvent for the lubricant and an organic solvent which is a poor solvent for the lubricant. Namely, the lubricant is dissolved uniformly in the good solvent, then the poor solvent is added thereto, and the mixture is stirred. Then, the mixture is subjected to phase separation, whereupon the lubricant phase is collected, and the solvent is removed to purify the lubricant. Each of the good solvent and the poor solvent to be used here, may be a mixture of two or more different types of solvents. The specific procedure for the purification of the lubricant may be illustrated as follows.

(1) A lubricant prepared by a synthesis, is dissolved in a good solvent to obtain a uniform solution. When the lubricant is hardly soluble, it may be dissolved by heating, for example, in a bath provided with a function to control the temperature.

(2) To this solution, a poor solvent is gradually added under stirring in an amount of from 4 to 5 times the amount of the good solvent already added.

(3) The mixture is thoroughly stirred and then left to stand still.

(4) When the phase separation has sufficiently be accomplished, only the lower layer is collected into a vessel.

(5) The operation of steps (1) to (4) is repeated at least three more times.

(6) The collected lubricant contains the organic solvent. Therefore, the solvent is removed by means of a drying apparatus such as an evaporator.

(7) Finally, filtration is conducted by means of a pressure-type filtration apparatus, to remove foreign matters contained in the lubricant.

In the case of a perfluoropolyether type lubricant, an ester will be a good solvent, and an alcohol will be a poor solvent. Accordingly, by purifying the lubricant by means of these solvents, it is possible to obtain a lubricant of such a purity that no impurities and low molecular weight species in the lubricant are substantially present as measured by GPC. As the ester, it is particularly preferred to employ the one represented by the following formula:

$$C_nH_{2n+1}COOC_mH_{2m+1} \qquad (1)$$

wherein each of m and n is an integer of from 1 to 10, and as the alcohol, it is particularly preferred to employ the one represented by the following formula:

$$C_pH_{2p+1}OH \qquad (2)$$

wherein p is an integer of from 1 to 10, from the viewpoint of their properties. Among the esters and alcohols of the above formulas (1) and (2), preferred are those wherein m, n and p are from 1 to 6. With respect to "AM2001" (product manufactured by Montefluos) among perfluoropolyether type lubricants, ethyl acetate is preferably used as the good solvent, and methanol is preferably used as the poor solvent. Each of such good solvent and poor solvent may be a mixture of two or more different types of solvents. By the above described purification, impurities and relatively low boiling point low molecular weight components in the lubricant will be removed. Accordingly, further improved C.S.S. durability will be imparted to the magnetic recording medium having such a purified lubricant coated thereon. Such an effect will be remarkable particularly when the lubricant after purification has a distribution of molecular weights beginning at a molecular weight of at least 700, a weight-average molecular weight of at least 2,000 and a molecular weight distribution (a weight-average molecular weight/a number-average molecular weight) of not more than 1.3. Further, the upper limit of the weight-average molecular weight of the lubricant is not more than 30,000, preferably, not more than 10,000, more preferably, not more than 8,000.

Heretofore, the step of coating a lubricant used to be complicated. For example, it included the following steps:

(1) A step of preheating the magnetic recording medium (2) A step of dipping the magnetic recording medium in a lubricant solution and withdrawing it therefrom (3) A step of drying the solvent for the lubricant on the magnetic recording medium (4) A step of heat treatment of the lubricant on the magnetic recording medium (5) A step of cooling the magnetic recording medium Whereas, when the purified lubricant of the present invention is employed, the process step of coating the lubricant can be simplified as follows:

(1) A step of dipping the magnetic recording medium in a lubricant solution and withdrawing therefrom (2) A step of drying the solvent for the lubricant on the magnetic recording medium By such simplification of the process for coating the lubricant, the productivity of the magnetic recording medium can be improved, and the production cost can be reduced.

As the solvent to be used in the present invention, any solvent, such as Fleon, may be employed without particular restriction so long as the lubricant is readily soluble therein and it readily evaporates after coated on the magnetic recording medium. However, when the lubricant is of a perfluoropolyether type, it is preferred to employ a fluorinated solvent containing no chlorine atom in its molecule. As such a solvent, a solvent of the following formula may be mentioned:

wherein each of $R_1$ to $R_3$ is an optional substituent other than a chlorine atom, at least one of $R_1$ to $R_3$ is a fluorine atom, each of $R_4$ to $R_6$ is an optional substituent other than a chlorine atom, at least one of $R_4$ to $R_6$ is a fluorine atom, and q is an integer of from 0 to 100, or

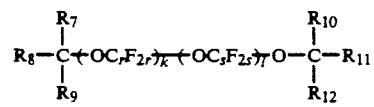

wherein each of $R_7$ to $R_9$ is an optional substituent other than a chlorine atom, at least one of $R_7$ to $R_9$ is a fluorine atom, each of $R_{10}$ to $R_{12}$ is an optional substituent other than a chlorine atom, at least one of $R_{10}$ to $R_{12}$ is a fluorine atom, $0 \leq r \leq 5$, $0 \leq s \leq 5$ (provided that the case of $r=s=0$ is excluded), $0 \leq k \leq 100$, $0 \leq l \leq 100$ and $1 \leq k+l \leq 100$ (provided that the case of $k=l=0$ is excluded).

The optional substituent in the above formulas includes, in addition to a fluorine atom, a $C_{1-5}$ alkyl group, a carboxyl group, a carbonyl group, a phenyl group, a sulfonic acid group, an alkoxy group and an ester group. Preferably, all of $R_1$-$R_6$ or $R_7$-$R_{12}$ are fluorine atoms. As such a fluorinated solvent containing no chlorine atom in its molecule, "Fluorinert FC72", "Fluorinert FC84", "Fluorinert FC77", "Fluorinert FC75", "Fluorinert FC40", "Fluorinert FC43" and "Fluorinert FC70" (tradenames) manufactured by Sumitomo Three M company, and "Fomblin ZS70" (tradename) manufactured by Montefluos Company, are, for example, commercially available.

The coating thickness of the lubricant and the concentration of the lubricant in the solvent can be properly adjusted corresponding to the required value of a friction coefficient observed between the magnetic recording medium and the head.

By the above method, the lubricant is purified to a level of a lubricant having such a purity that no impurities are substantially present as measured by GPC. The purified lubricant is dissolved in a solvent, particularly in a fluorinated solvent containing no chlorine atom in its molecule, and coated on a magnetic recording medium by a dipping method or a spin-coating method to obtain a magnetic recording medium of the present invention. The lubricant coated on the magnetic recording medium in this manner undergoes no substantial change in the thickness even when kept under a high temperature high humidity condition. Thus, the magnetic recording medium of the present invention is excellent also in the durability.

Now, the present invention will be described in detail with reference to Examples. However, it should be understood that the present invention is by no means restricted by such specific Examples.

EXAMPLES 1 and COMPARATIVE EXAMPLE 1

A perfluoropolyether type lubricant (AM 2001, product manufactured by Montefluos Company) was purified by ethyl acetate and methanol. The purification was conducted as follows:

(1) Firstly, 0.5 kg of the lubricant was put into a separating funnel, and 500 ml of ethyl acetate was added thereto. The mixture was thoroughly shaked and stirred until a uniform solution was obtained.

(2) Then, to the solution obtained in step (1), methanol was gradually added, and the mixture was shaked from time to time. Methanol was added in a total amount of 2,000 ml, and thereafter the mixture was thoroughly stirred.

(3) After stirring, the mixture was left to stand still for two hours.

(4) Of the separated two layers, the liquid of the lower layer was collected into a flask.

(5) The operation of the above steps (1) to (4) was repeated three more times, and then the liquid of the lower layer was collected into an eggplant type flask.

(6) Then, the mixture was dried at 40° C. for 8 hours by an evaporator to remove the solvent.

(7) Finally, the lubricant having the solvent removed was filtered through a filter (0.5 μm) and collected into a clean bottle.

A part of the lubricant purified as above, was sampled and used for evaluation of the degree of purification by GPC. FIG. 1 shows a chart by GPC of the purified lubricant, and FIG. 2 shows a chart by GPC of the non-purified lubricant. When the two charts are compared, in FIG. 2, several small peaks other than the main peak are observed on the low molecular weight side, and these peaks were confirmed to be attributable to the impurities contained in the lubricant. Such peaks attributable to the impurities are not observed in FIG. 1, whereby it was confirmed that the lubricant was adequately purified. Further, the average molecular weight and the molecular weight distribution were obtained by GPC. The results are shown in Table 1. From Table 1, it is evident that the lubricant purified by the above purification has a large average molecular weight as compared with the non-purified lubricant, and it was confirmed that by the purification, the low molecular weight components in the lubricant were removed.

The gel permeation chromatograph was measured under the following conditions:
1) Column: "TSK G4000HXL", "TSK G3000HXL" and "TSK G2000HXL" (tradenames, manufactured by TOSOH CORPORATION were connected for use.
2) Eluent: THF
3) Detector: UV detector
4) Wavelength for detection: 286 nm
5) Molecular weight: calculated as polystyrene

TABLE 1

|  | Purified product | Non-purified product |
|---|---|---|
| Number average molecular weight | 3700 | 1800 |
| Weight average molecular weight | 4200 | 2900 |
| Molecular weight distribution | 1.13 | 1.61 |

Then, using the above purified product of lubricant, the lubricant was coated in a thickness of 0.002 μm on a magnetic recording medium by a dipping method. This magnetic recording medium was the one prepared by laminating on an aluminum alloy substrate, a textured NiP layer of 15 μm formed by an electroless plating method, 0.2 μm of a chromium layer formed by a sputtering method, 0.05 μm of a magnetic recording layer made of a Co-Ni-Cr type alloy and 0.03 μm of a carbon layer, and its surface roughness Ra was from 80 to 90 Å. With respect to the conditions for coating the lubricant, Fleon 113 (Daiflon S3, tradename, manufactured by Daikin Kogyo Co., Ltd.) was used as the solvent for the lubricant, a solution prepared by dissolving the lubricant in the solvent at a concentration of 0.5% by volume, was used, and the withdrawing speed was adjusted to a level of 1.0 mm/sec. This solution was transparent, and the solubility of the lubricant was excellent.

Figure 3:
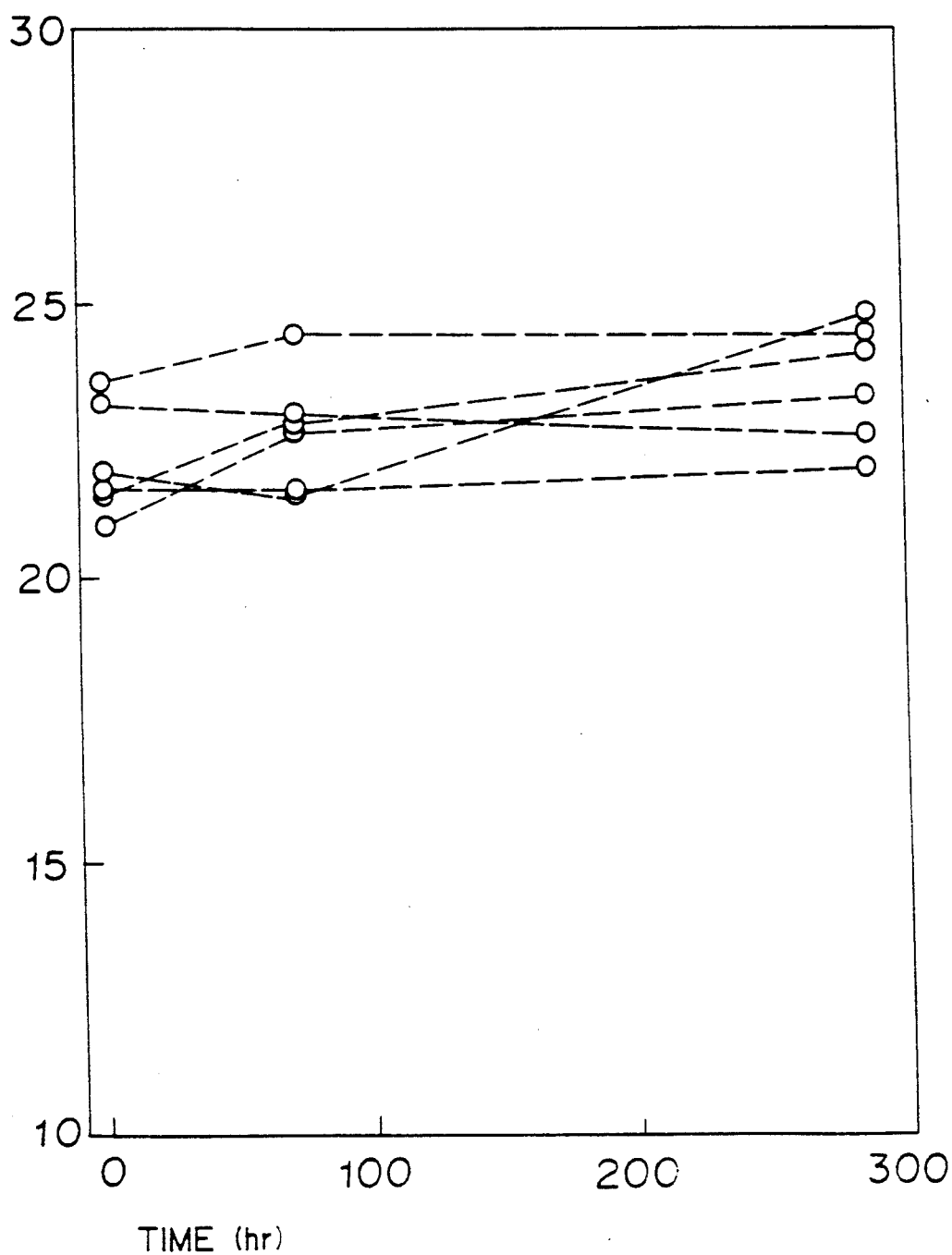
FIGS. 3 to 6 are graphs showing the results of the measurements of the change with time of the thickness of the lubricant coated on the magnetic recording medium in Example 1 of the present invention.
Figure 4:
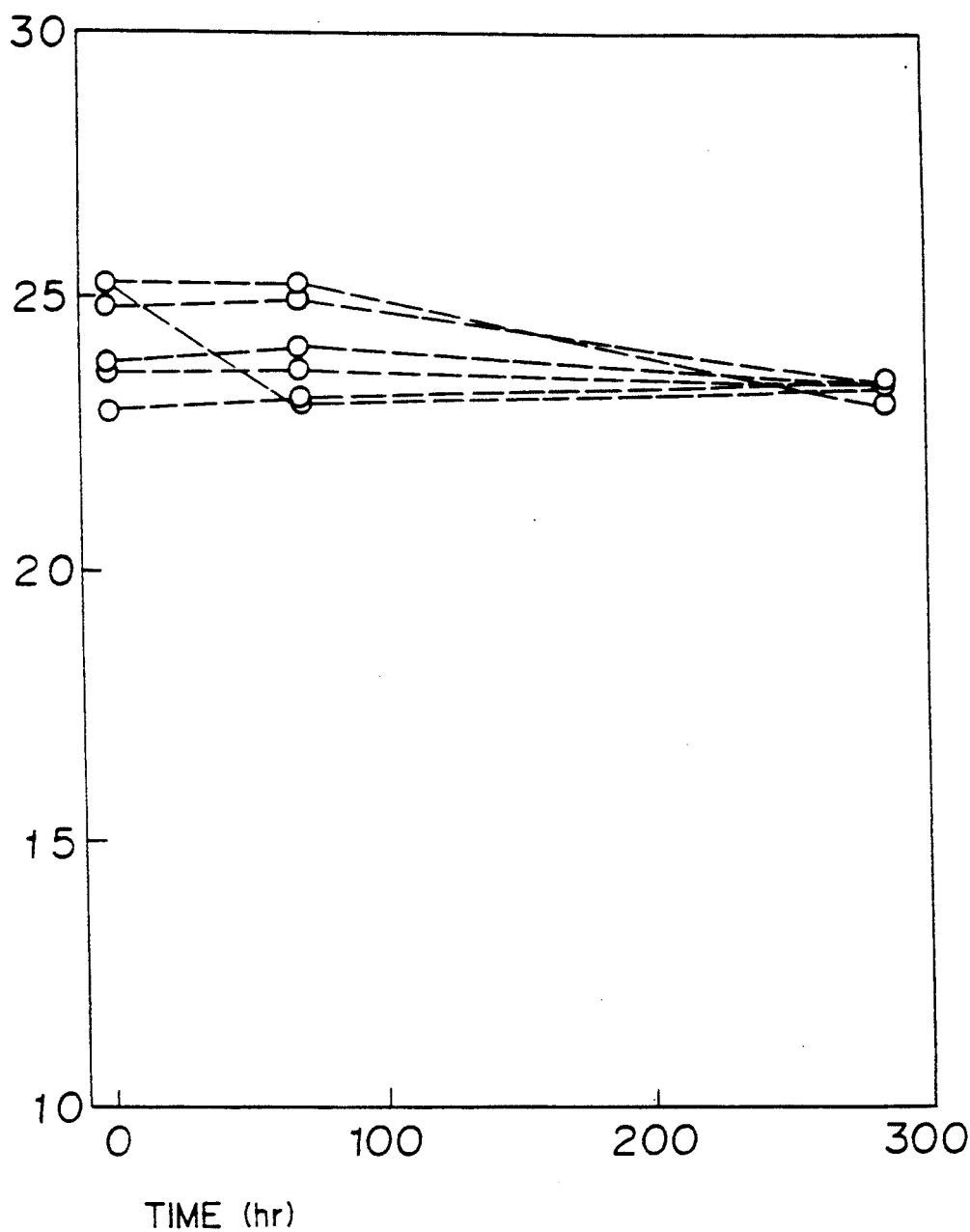
Figure 5:
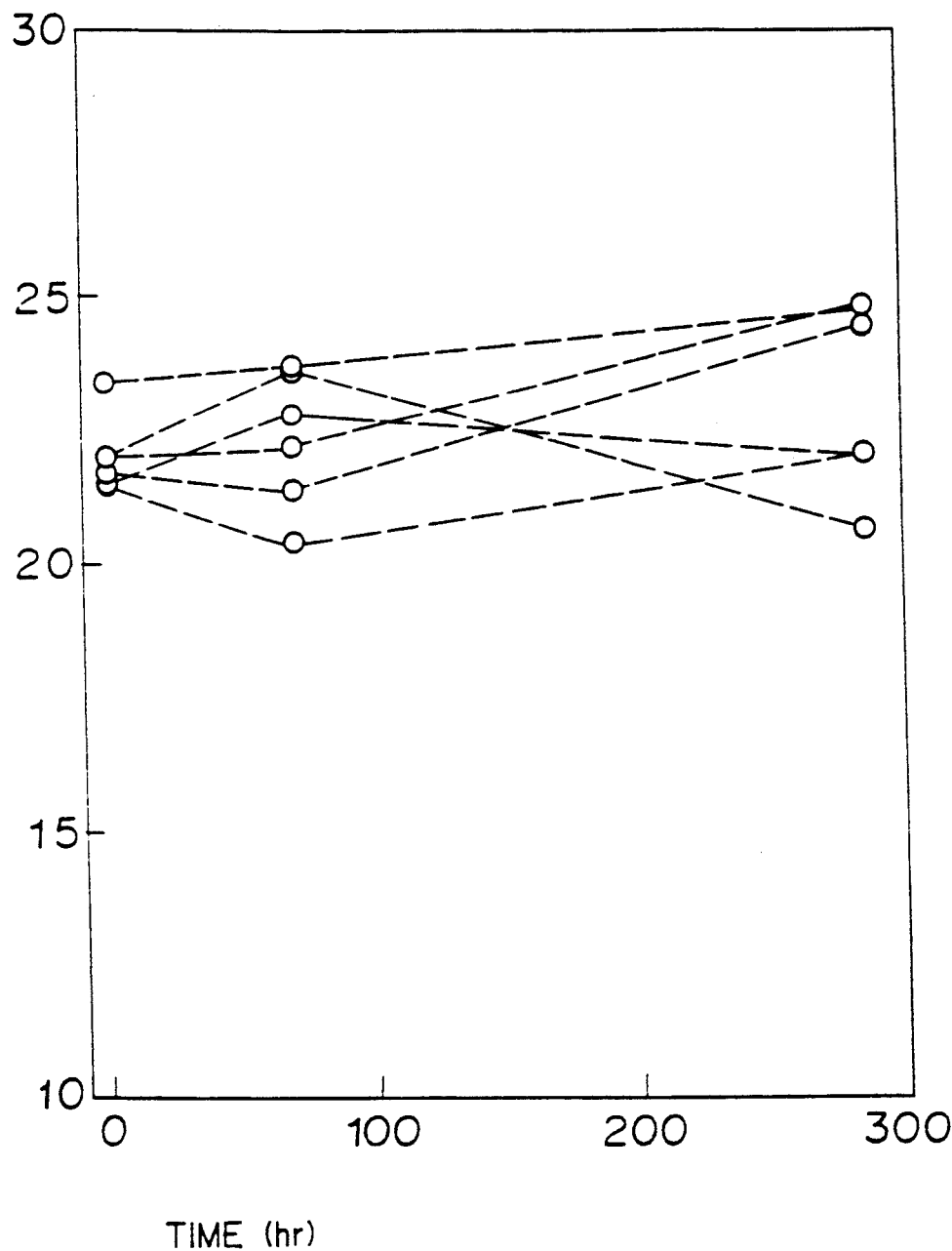
Figure 6:
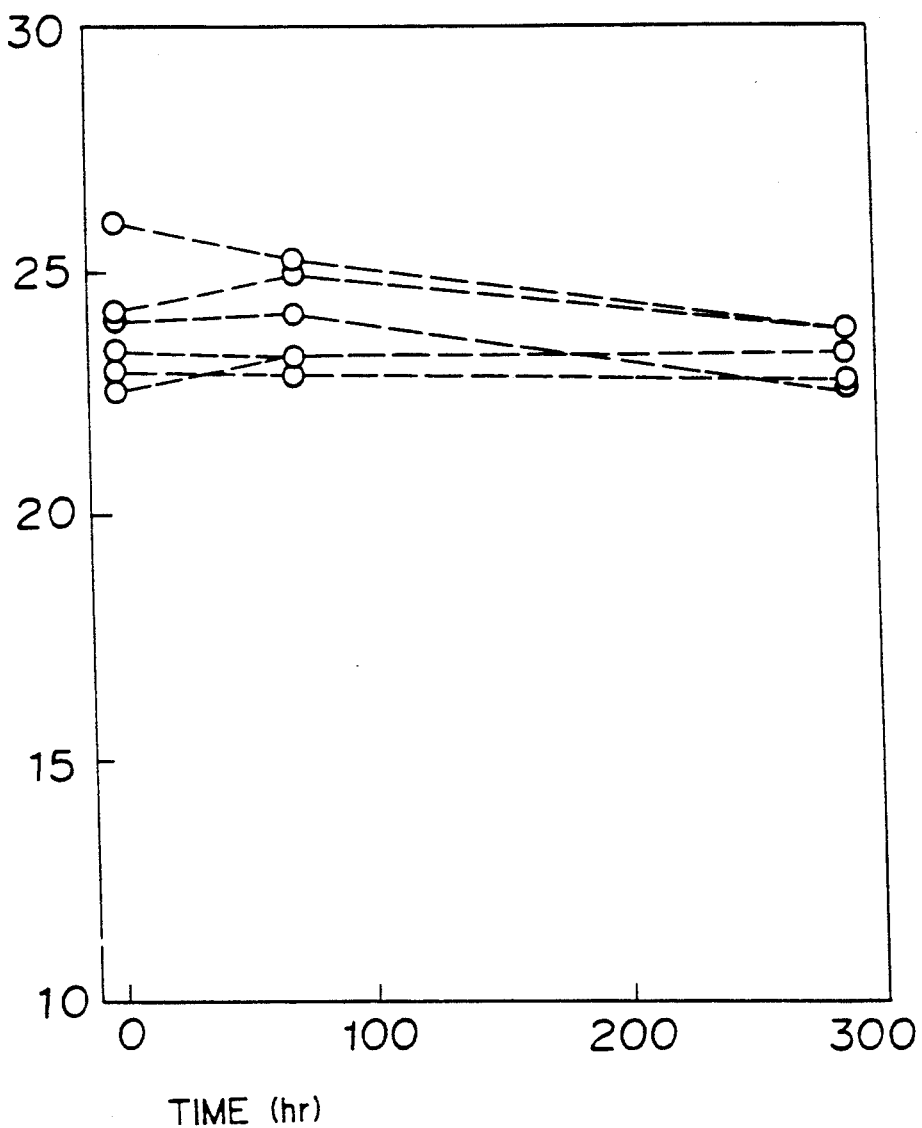

Thereafter, the magnetic recording medium having the lubricant coated thereon was left to stand for about 300 hours in an environment of 60° C. and a relative humidity of 80%. The thickness of the coated lubricant under this environmental condition was measured as the time passed from the intensity of absorption observed at a wavelength of from 1,020 to 1,355 cm$^{-1}$ by FT-IR. Here, the error in measurement was not more than 2.5 Å. The results are shown in FIGS. 3 to 6. In the respective figures, the measuring positions were as follows:

|  | Measured side | Measuring position |
|---|---|---|
| FIG. 3: | Side A | 25 mm from the center |
| FIG. 4: | Side A | 40 mm from the center |
| FIG. 5: | Side B | 25 mm from the center |
| FIG. 6: | Side B | 40 mm from the center |

Figure 7:
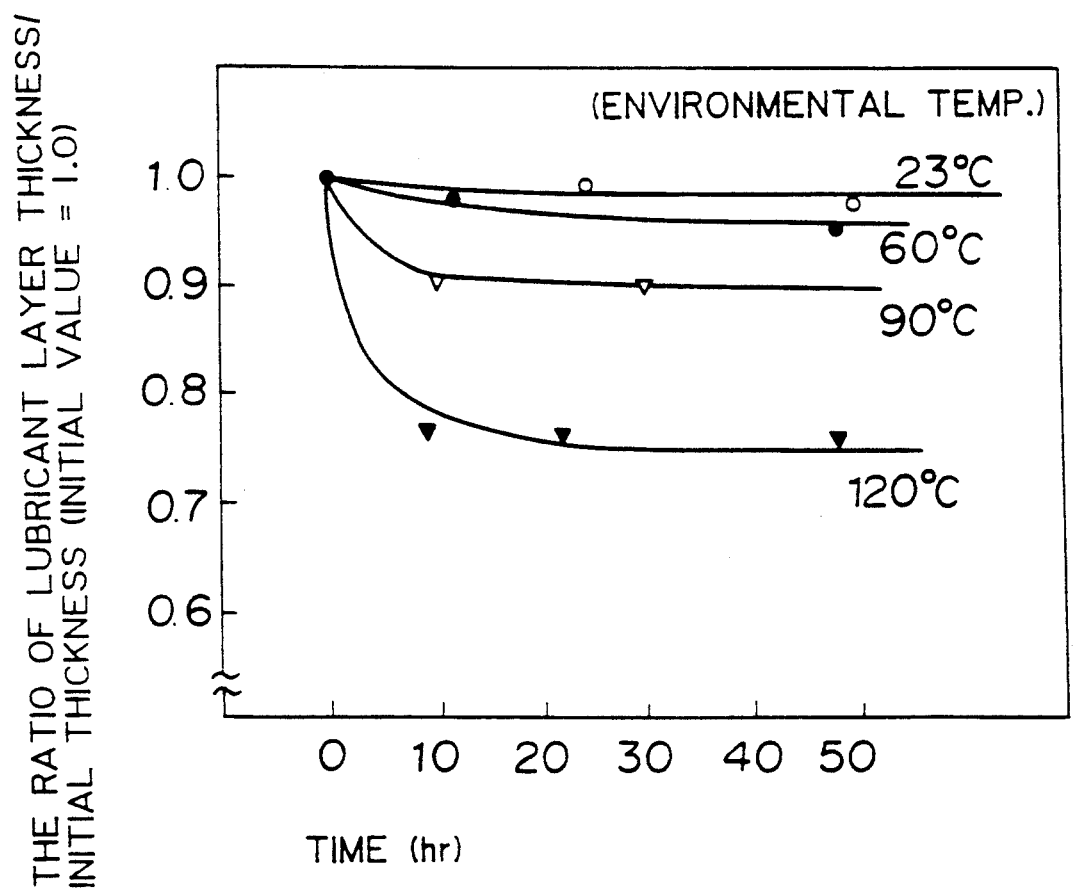
FIG. 7 is a graph showing the results of the measurement of the change with time of the thickness of the lubricant coated on the magnetic recording medium in Comparative Example 1.

From FIGS. 3 to 6, some of the thicknesses of the lubricant are found to be changed as the time passed, but such changes are within the range of the error in measurement. Therefore, it was judged that there was no decrease in the thickness of the lubricant. For the purpose of comparison, the non-purified lubricant was dissolved in Fleon 113 (Daiflon S3, tradename, manufactured by Daikin Kogyo Co., Ltd.) at a concentration of 0.5% by volume, the solution was coated on the magnetic recording medium, and the medium was left to stand for about 50 hours under a high temperature environmental condition, whereby the change with time of the thickness of the lubricant was measured, in the same manner as in the above Example. The results are shown in FIG. 7. From the results of the measurement, the thickness of the lubricant of the magnetic recording medium having the non-purified lubricant coated thereon, was found to decrease, and the degree of the decrease was found to be largely dependent on the environmental temperature. Particularly, the change was more than 5% at 60° C.

The solution of the lubricant was transparent, and the solubility of the lubricant was excellent.

EXAMPLE 2 and COMPARATIVE EXAMPLE 2

A magnetic recording medium was prepared in the same manner as in Example 1 except that the thickness of the lubricant was changed (Example 2). For the purpose of comparison, a magnetic recording medium was prepared in the same manner as in Comparative Example 1 except that the thickness of the lubricant was changed (Comparative Example 2).

Then, in an environment of the temperature of 23° C. and a relative humidity of 50%, a head was put on the above magnetic recording medium, and the magnetic recording medium was rotated for 60 minutes at a rotational speed of 100 rpm, whereby the sliding friction coefficient between the medium and the head was measured by a simple friction measuring apparatus. The measuring position was at a distance of 21.5 mm from the center of the magnetic recording medium, and a ferrite head was used as the head. The results in Example 2 are shown at (A) in FIG. 8, and the results in Comparative Example 2 are shown at (B) in FIG. 8.

Further, in a constant temperature and humidity chamber, a stiction measuring apparatus having the magnetic recording medium mounted thereon, was left to stand for 24 hours in an environment of a temperature of 33° C. and a relative humidity of 80%, whereupon the static friction coefficient between the disk and the head was measured. The measuring position was at a distance of 21.5 mm from the center of the magnetic recording medium, and a ferrite head was used as the head. The results in Example 2 are shown at (C) in FIG. 8, and the results in Comparative Example 2 are shown at (D) in FIG. 8.

From the results of the above measurements, the dependency of the friction coefficient on the magnetic recording medium of the present invention on the thickness of the lubricant, was found to be small, and with the magnetic recording medium of Example 2, even when the thickness of the lubricant was made to be thin at a level of 12 Å, it was found to have a sufficiently practical sliding frictional characteristic. Whereas, with the magnetic recording medium of Comparative Example 2 having the non-purified lubricant coated thereon, when the thickness of the lubricant became not more than 20 Å, the friction coefficient tended to be as high as 0.4 or more, such being practically useless.

Figure 8:
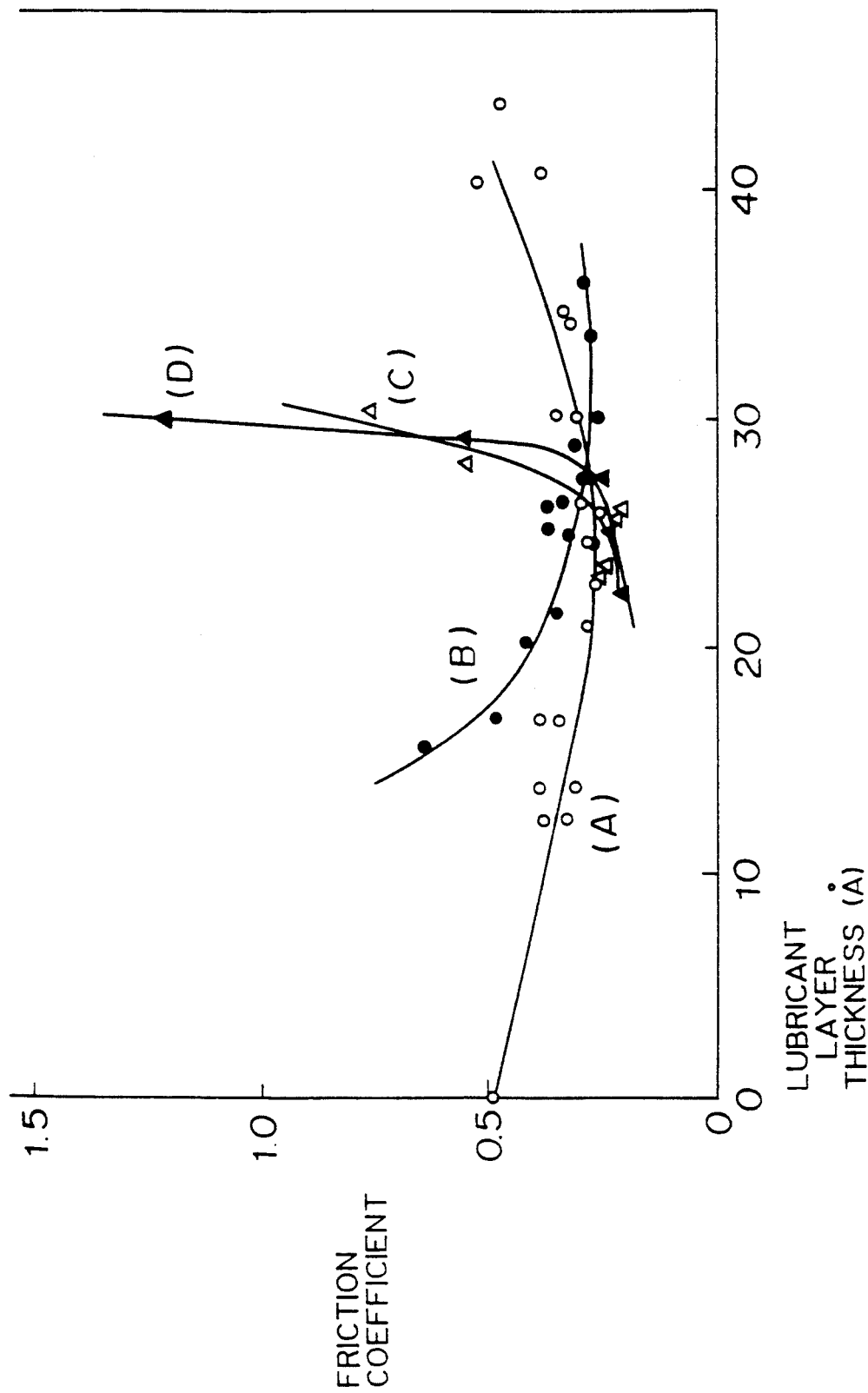
FIG. 8 is a graph showing the results of evaluation of the dependency of the sliding friction coefficient between the magnetic recording medium and the head on the thickness of the lubricant and the dependency of the static friction coefficient on the thickness of the lubricant. In the figure, (A) shows the dependency of the sliding friction coefficient between the magnetic recording medium of the present invention and the head on the thickness of the lubricant, (B) shows the dependency of the sliding friction coefficient between the magnetic recording medium prepared for the purpose of comparison and the head on the thickness of the lubricant, (C) shows the dependency of the static friction coefficient between the magnetic recording medium of the present invention and the head on the thickness of the lubricant, and (D) shows the dependency of the static friction coefficient between the magnetic recording medium prepared for the purpose of comparison and the head on the thickness of the lubricant.

The upper limit of the thickness of the thickness of the lubricant is restricted by the stiction characteristic between the magnetic medium and the head, but this stiction characteristic was found to be substantially equal as between the magnetic recording medium of Example 2 and the magnetic recording medium of Comparative Example 2 from (C) and (D) of FIG. 8.

EXAMPLE 3

Samples of the magnetic recording medium were prepared in the same manner as in Example 1 (Samples 1 and 2).

Then, in a constant temperature and humidity chamber, a stiction measuring apparatus having the obtained magnetic recording medium mounted thereon, was placed, and left to stand for 240 hours in the constant temperature and humidity chamber set to have an environment of a temperature of 33° C. and relative humidity of 80%. Then, the static friction coefficient between the magnetic recording medium and the head was measured. The measuring position was at a distance of 23 mm from the center of the magnetic recording medium, and a ferrite head was used as the head. The results are shown in Table 2.

TABLE 2

| | Static friction coefficient | |
|---|---|---|
| | Before the test | After the test |
| Sample 1 | 0.19 | 0.39 |
| Sample 2 | 0.14 | 0.22 |

EXAMPLES 4 and COMPARATIVE EXAMPLE 3

Samples of the magnetic recording medium were prepared in the same manner as in Example 1 (Samples 3 to 6). Further, a magnetic recording medium was prepared in the same manner as in Comparative Example 1 (Comparative Example 3).

Then, the obtained magnetic recording medium was assembled together with a head into a disk drive, and the static friction coefficient ($\mu$) between the magnetic recording medium and the head was measured by a torque meter. Then, this disk drive was set in a constant temperature and humidity chamber having a temperature of 33° C. and relative humidity of 80%, and the drive was driven for C.S.S. at a rotational speed of 3,350 rpm. After the C.S.S. drive was repeated 10,000 times, the static friction coefficient ($\mu 10K$) between the magnetic recording medium and the head was measured, and the disk drive was further left to stand for 24 hours, and then static friction coefficient ($\mu 24$ Hr) between the magnetic recording medium and the head was measured. The measuring position was at a distance of 26.9 mm from the center of the magnetic recording medium, and a ferrite head was used as the head. The results are shown in Table 3.

TABLE 3

| | Friction coefficient | | | |
|---|---|---|---|---|
| | $\mu$ (initial) | $\mu 10K$ (after C.S.S. test) | $\mu 24$ Hr (after left to stand) | $\Delta\mu$ ($\mu 24$ Hr - $\mu 10K$) |
| Sample 3 | 0.14 | 0.20 | 0.20 | 0.00 |
| Sample 4 | 0.15 | 0.30 | 0.37 | 0.07 |
| Sample 5 | 0.16 | 0.23 | 0.21 | −0.02 |
| Sample 6 | 0.17 | 0.25 | 0.24 | −0.01 |
| Comparative Example 3 | 0.15 | 1.08 | 1.26 | 0.18 |

EXAMPLE 5 and COMPARATIVE EXAMPLE 4 and 5

Samples of the magnetic recording medium were prepared in the same manner as in Example 1 (Samples 7 to 13). Further, magnetic recording media were prepared in the same manner as in Comparative Example 1 (Comparative Examples 4 and 5).

Figure 9:
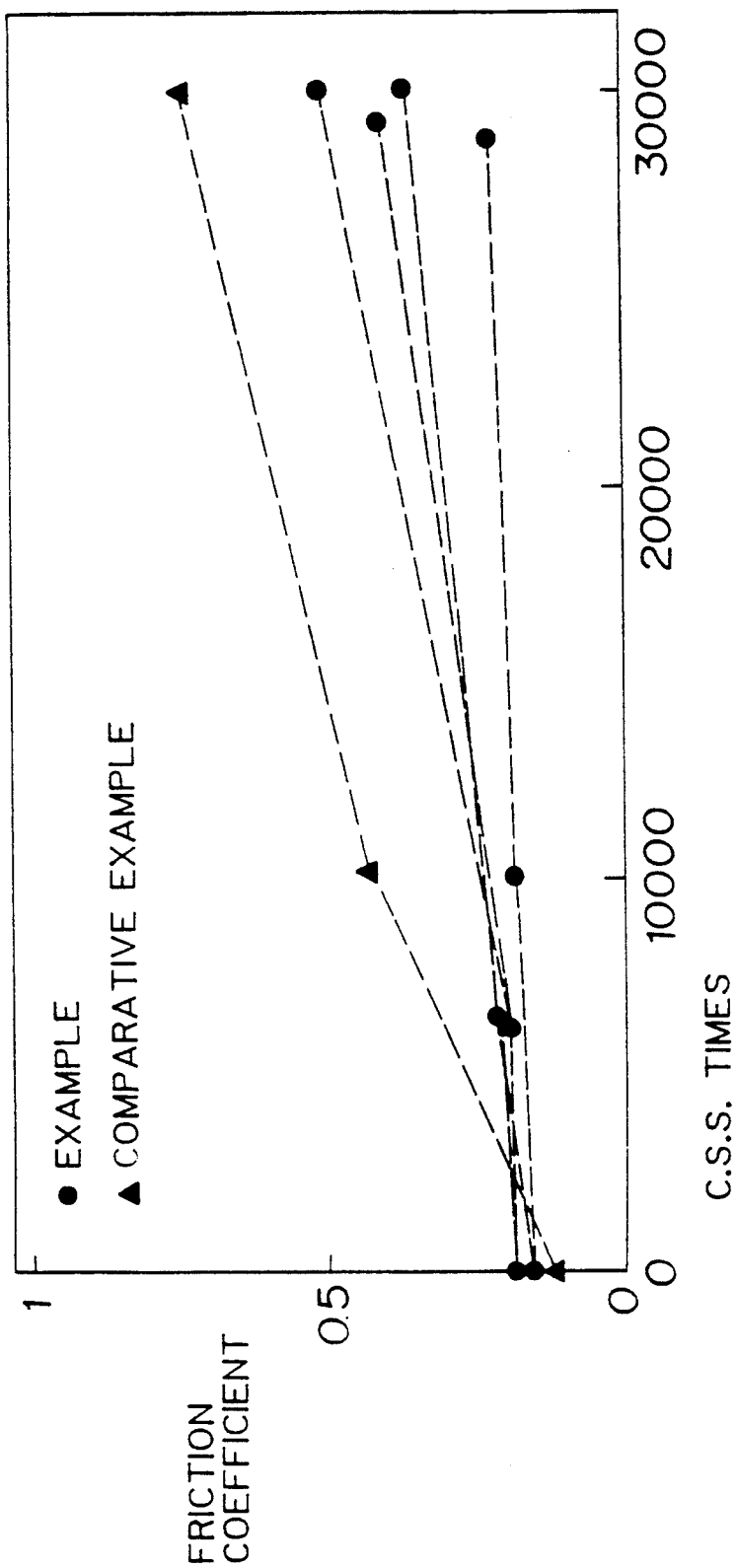
FIG. 9 is a graph showing the results of the measurement of the changes with time of the static friction coefficients of the magnetic recording media set in a constant temperature and humidity chamber A in Example 5 of the present invention and in Comparative Example 4.
Figure 10:
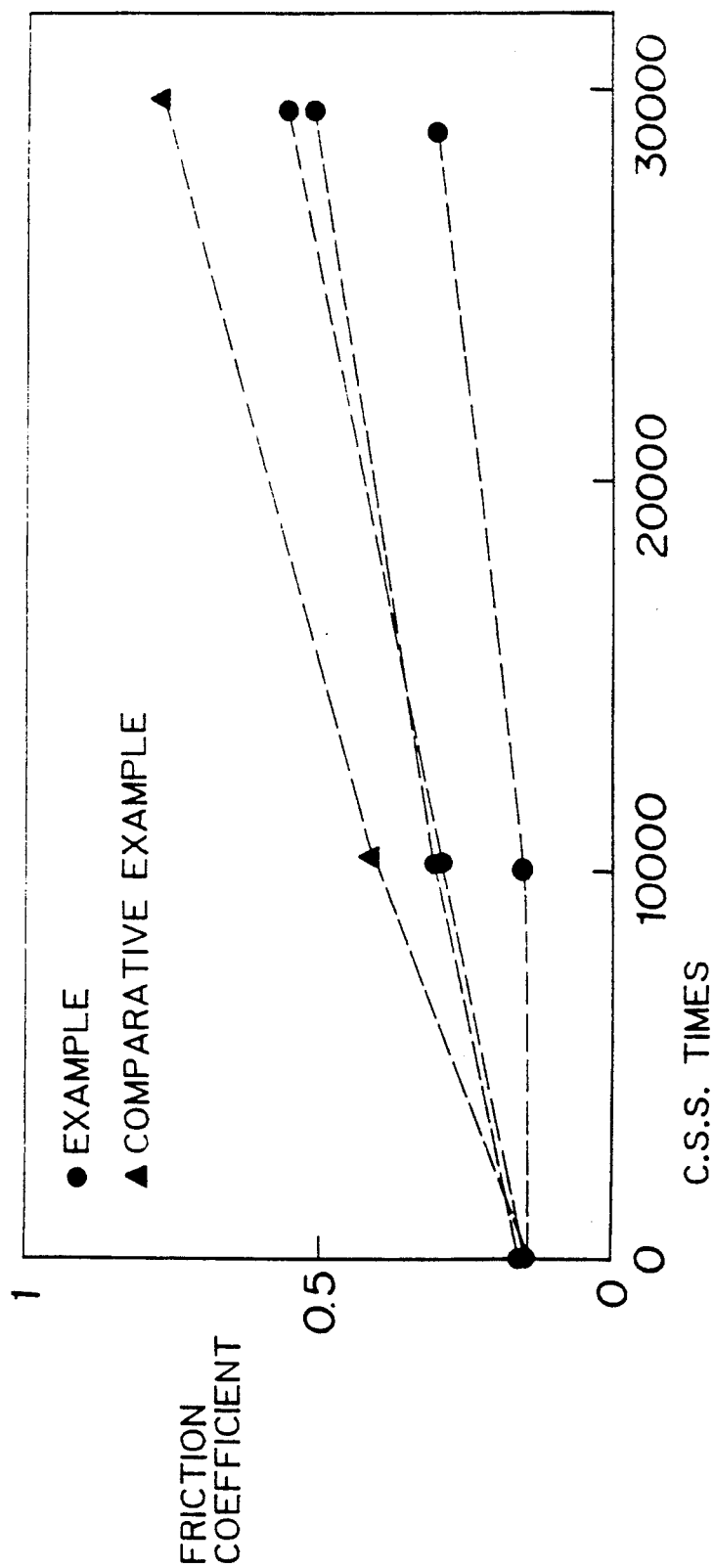
FIG. 10 is a graph showing the results of the measurement of the changes with time of the static friction coefficients of the magnetic recording media set in a constant temperature and humidity chamber B in Example 5 of the present invention and in Comparative Example 4.

Then, the friction characteristics between the magnetic recording media and the head in C.S.S. test in an environment at a temperature of 60° C. or at a temperature of 5° C. were evaluated. Firstly, a magnetic recording medium was assembled together with a head into a disk drive, and the static friction coefficient ($\mu$) between the magnetic recording medium and the head was measured by a torque meter. Then, the disk drive was set in a constant temperature and humidity chamber A of a temperature of 60° C. and a relative humidity of 50% or in a constant temperature and humidity chamber B of a temperature of 5° C. and a relative humidity of 40%, and the drive was driven for C.S.S. of 30,000 times at a rotational speed of 3,350 rpm, whereupon the static friction coefficient ($\mu 30K$) between the magnetic recording medium and the head was measured, and then the disk drive was left to stand for 24 hours, and the static friction coefficient ($\mu 24$ Hr) between the magnetic recording medium and the head was measured. The measuring position was at a distance of 26.9 mm from the center of the magnetic recording medium, and a ferrite head was used as the head. The results of measuring the static friction coefficients of the magnetic recording media set in the constant temperature and humidity chamber A are shown in Table 4, the changes with time of the static friction coefficients are shown in FIG. 9, the results of measuring the static friction coefficients of the magnetic recording media set in the constant temperature and humidity chamber B are shown in Table 5, and the changes with time of the static friction coefficients are shown in FIG. 10. As a result, the magnetic recording media of the present invention were found to have excellent friction characteristics in C.S.S. test as compared with the magnetic recording media having the non-purified lubricant coated thereon.

TABLE 4

| | Friction coefficient | | | |
|---|---|---|---|---|
| | $\mu$ (initial) | $\mu$30K (after C.S.S. test) | $\mu$24 Hr (after left to stand) | $\Delta\mu$ ($\mu$24 Hr-$\mu$30K) |
| Sample 7 | 0.16 | 0.23 | 0.21 | −0.02 |
| Sample 8 | 0.16 | 0.37 | 0.32 | −0.05 |
| Sample 9 | 0.16 | 0.41 | 0.34 | −0.07 |
| Sample 10 | 0.19 | 0.51 | 0.55 | 0.04 |
| Comparative Example 4 | 0.14 | 0.75 | 1.56 | 0.81 |

TABLE 5

| | Friction coefficient | | | |
|---|---|---|---|---|
| | $\mu$ (initial) | $\mu$30K (after C.S.S. test) | $\mu$24 Hr (after left to stand) | $\Delta\mu$ ($\mu$24 Hr-$\mu$30K) |
| Sample 11 | 0.16 | 0.51 | 0.70 | 0.19 |
| Sample 12 | 0.15 | 0.55 | 0.67 | 0.12 |
| Sample 13 | 0.14 | 0.30 | 0.57 | 0.27 |
| Comparative Example 5 | 0.14 | 0.77 | 1.87 | 1.10 |

EXAMPLE 6

The purified lubricant obtained in Example 1 was diluted with a fluorinated solvent containing no chlorine atom in its molecule (Fluorinert FC-77, tradename, manufactured by Sumitomo Three M Company) to a concentration of 0.25% by volume. The appearance and the solubility are shown in Table 6.

EXAMPLE 7

The purified lubricant obtained in Example 1 was diluted with a fluorinated solvent containing no chlorine (Fluorinert FC-72, tradename, manufactured by Sumitomo Three M Company) to a concentration of 0.25% by volume. The appearance and the solubility are shown in Table 6.

EXAMPLE 8

The purified lubricant obtained in Example 1 was diluted with a fluorinated solvent containing no chlorine (Fluorinet FC-84, tradename, manufactured by Sumitomo Three M Company) to a concentration of 0.25% by volume. The appearance and the solubility are shown in Table 6.

EXAMPLE 9

The purified lubricant obtained in Example 1 was diluted with a fluorinated solvent containing no chlorine (Fluorinert FC-75, tradename, manufactured by Sumitomo Three M Company) to a concentration of 0.25% by volume. The appearance and the solubility are shown in Table 6.

EXAMPLE 10

The purified lubricant obtained in Example 1 was diluted with a fluorinated solvent containing no chlorine (Fomblin ZS-70, tradename, manufactured by Montefluos Company) to a concentration of 0.25% by volume. The appearance and the solubility are shown in Table 6.

COMPARATIVE EXAMPLE 6

The non-purified lubricant used in Example 1 was diluted with a fluorinated solvent containing no chlorine (Fluorinert FC-77, tradename, manufactured by Sumitomo Three M Company) to a concentration of 0.25% by volume. The appearance and the solubility are shown in Table 6.

COMPARATIVE EXAMPLE 7

The non-purified lubricant used in Example 1 was diluted with a fluorinated solvent containing no chlorine (Fluorinert FC-72, tradename, manufactured by Sumitomo Three M Company) to a concentration of 0.25% by volume. The appearance and the solubility are shown in Table 6.

COMPARATIVE EXAMPLE 8

The non-purified lubricant used in Example 1 was diluted with a fluorinated solvent containing no chlorine (Fluorinert FC-84, tradename, manufactured by Sumitomo Three M Company) to a concentration of 0.25% by volume. The appearance and the solubility are shown in Table 6.

COMPARATIVE EXAMPLE 9

The non-purified lubricant used in Example 1 was diluted with a fluorinated solvent containing no chlorine (Fluorinert FC-75, tradename, manufactured by Sumitomo Three M Company) to a concentration of 0.25% by volume. The appearance and the solubility are shown in Table 6.

COMPARATIVE EXAMPLE 10

The non-purified lubricant used in Example 1 was diluted with a fluorinated solvent containing no chlorine (Fomblin ZS-70, tradename, manufactured by Montefluos Company) to a concentration of 0.25% by volume. The appearance and the solubility are shown in Table 6.

TABLE 6

| | | Solvent (tradename) | Appearance | Solubility |
|---|---|---|---|---|
| Examples | 6 | Fluorinert FC-77 | Transparent | O |
| | 7 | Fluorinert FC-72 | Transparent | O |
| | 8 | Fluorinert FC-84 | Transparent | O |
| | 9 | Fluorinert FC-75 | Transparent | O |
| | 10 | Fomblin ZS-70 | Transparent | O |
| Comparative Examples | 6 | Fluorinert FC-77 | Turbid | X |
| | 7 | Fluorinert FC-72 | Turbid | X |
| | 8 | Fluorinert FC-84 | Turbid | X |
| | 9 | Fluorinert FC-75 | Turbid | X |
| | 10 | Fomblin ZS-70 | Turbid | X |

From the above observation of the solutions of lubricants diluted with solvents, it was observed that the solubility of the purified lubricant in the fluorinated solvent containing no chlorine atom in its molecule was excellent, while the solubility of the non-purified lubricant in the fluorinated solvent containing no chlorine atom in its molecule was very poor, and turbidity was observed. From the foregoing, the lubricant of such a purity that no impurities and low molecular weight species are substantially detected by GPC, was found to show high solubility to a fluorinated solvent containing no chlorine atom in its molecule.

EXAMPLE 11

Using the lubricant solution obtained in Example 6, the lubricant was coated on a magnetic recording medium in a thickness of 0.002 μm by a dipping method. The magnetic recording medium used here, was the one prepared by laminating on an aluminum alloy substrate, a textured NiP layer of 15 μm in thickness formed by an electroless plating method, a chromium undercoating layer of 0.2 μm in thickness formed by a sputtering method, a magnetic recording layer of 0.05 μm in thickness made of a Co-Ni-Cr alloy and a carbon layer of 0.03 μm in thickness sequentially. The surface roughness Ra of the magnetic recording medium was from 60 to 80 Å. In the dipping method, the withdrawing speed was 2.0 mm/sec.

Then, the frictional characteristic between the obtained magnetic recording medium and a magnetic head was evaluated by a C.S.S. test. The evaluation was conducted under the following conditions. As the magnetic head, a ferrite head was used. The C.S.S. test was conducted under a load of the head of 9.5 g, and the static friction coefficient between the magnetic recording medium and the ferrite head was measured. The results are shown in Table 7.

(1) Test 1
Temperature: 33° C.
Relative humidity: 80%
C.S.S. times: 10,000 times
Measured radius: 21 mm
Rotational speed of the disk: 3,600 rpm (2) Test 2
Temperature: 5° C.
Relative humidity: 40–50%
C.S.S. times: 30,000 times
Measured radius: 21 mm
Rotational speed of the disk: 3,600 rpm

EXAMPLE 12

Using the lubricant solution obtained in Example 10, the lubricant was coated on the surface of a magnetic recording medium by a dipping method. The withdrawing speed was 2.2 mm/sec, and other conditions were the same as in Example 11.

Then, the frictional characteristic between the obtained magnetic recording medium and a magnetic head was evaluated by a C.S.S. test in the same manner as in Example 11. The results are shown in Table 7.

EXAMPLE 13

The non-purified lubricant used in Example 1 was dissolved in Fleon 113 (Daiflon S3, tradename, manufactured by Daikin Kogyo K.K.) to obtain a lubricant solution. The concentration of the lubricant was 0.25 vol %. The withdrawing speed was 2.2 mm/sec. Other conditions were the same as in Example 11.

Then, the frictional characteristic between the obtained magnetic recording medium and a magnetic head was evaluated by a C.S.S. test in the same manner as in Example 11. The results are shown in Table 7.

COMPARATIVE EXAMPLE 11

The lubricant solution obtained in Comparative Example 8 was used. The withdrawing speed was 2.6 mm/sec. Other conditions were the same as in Example 11.

Then, the frictional characteristic between the obtained magnetic recording medium and a magnetic head was evaluated by a C.S.S. test in the same manner as in Example 11. The results are shown in Table 7.

TABLE 7

|  | Static friction coefficient | |
|---|---|---|
|  | Test 1 | Test 2 |
| Example 11 | 0.61 | 0.48 |
| Example 12 | 0.59 | 0.55 |
| Example 13 | 0.60 | 0.50 |
| Comparative Example 11 | 1.08 | 0.77 |

From the test results shown in Table 7, the following is evident. According to the process for producing a magnetic recording medium having the lubricant of the present invention coated thereon, the frictional characteristic between the magnetic recording medium and the magnetic head in a case where a fluorinated solvent containing no chlorine atom in its molecule is used, is equal or superior to the frictional characteristic in a case where a conventional fluorinated solvent (such as Fleon 113) containing chlorine in its molecule was used.

Further, the frictional characteristic of the magnetic recording medium of the present invention is superior to the frictional characteristic of the magnetic recording medium having a conventional lubricant coated by means of a fluorinated solvent containing no chlorine atom in its molecule.

As described in the foregoing, no migration phenomenon occurs with the magnetic recording medium of the present invention, and the lubricating characteristic of its surface is excellent even under a high temperature, low temperature or high humidity environmental condition, thus providing excellent durability in C.S.S. test.

Further, by using the lubricant of the present invention, the process for coating the lubricant can be simplified, whereby the productivity of the magnetic recording medium can be improved, and the cost can be reduced.

Further, it is possible to apply the lubricant on the surface of the magnetic recording medium without using a fluorinated solvent containing chlorine atom in its molecule which is regarded as a factor for causing environmental pollution.

What is claimed is:

1. A magnetic recording medium comprising a magnetic film layer having coated thereon a layer of purified perfluoropolyether lubricant having the formula:

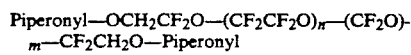

Piperonyl—OCH$_2$CF$_2$O—(CF$_2$CF$_2$O)$_n$—(CF$_2$O)$_m$—CF$_2$CH$_2$O—Piperonyl which lubricant has a weight-average molecular weight of at least 2000 and a weight-average molecular weight/number average molecular weight ratio of not more than 1.3 and which contains no chemical species having a molecular weight of less than about 700, and wherein said lubricant has been purified by
 1) dissolving said lubricant in a good solvent to obtain a uniform solution, 2) adding to the solution of lubricant in good solvent a poor solvent under stirring in an amount of from 4-5 times the amount of good solvent already present,
3) thoroughly mixing the solution obtained in (2),
4) allowing the mixed solution obtained in (3) to stand still and phase separate,
5) collecting the good solvent containing the lubricant,
6) repeating steps (2)-(4) at least three times,
7) removing the good solvent from the lubricant,
8) filtering the lubricant.

2. A magnetic recording medium as claimed in claim 1, wherein said perfluoropolyether lubricant layer has a thickness of from 12 to 22 Angstroms.

3. A magnetic recording medium as claimed in claim 1, wherein said good solvent is an ester represented by the following formula:

$$C_nH_{2n+1}COOC_mH_{2m+1}$$

wherein each of m and n is an integer of from 1 to 10 and wherein said poor solvent is an alcohol represented by the following formula:

$$C_pH_{2p+1}OH$$

wherein p is an integer of from 1 to 10.

4. A magnetic recording medium as claimed in claim 1, wherein said weight-average molecular weight of said lubricant is not more than 8000.

* * * * *